United States Patent [19]

Burley et al.

[11] 4,274,999
[45] Jun. 23, 1981

[54] COMPOSITIONS FOR STABILIZING A VINYL OR VINYLIDENE HALIDE POLYMER OR CHLORINATED POLYETHYLENE, POLYMER COMPOSITIONS COMPRISING SUCH A STABILIZER COMPOSITION AND SHAPED ARTICLES PREPARED THEREFROM

[75] Inventors: Joseph W. Burley, St. Helens; Peter Hope, Liverpool; Malcolm G. Pritchard, Southport, all of England

[73] Assignee: Akzo N.V., Arnhem, Netherlands

[21] Appl. No.: 140,496

[22] Filed: Apr. 15, 1980

[30] Foreign Application Priority Data

Apr. 17, 1979 [GB] United Kingdom ............... 13202/79

[51] Int. Cl.$^3$ ............................................... C08K 5/58
[52] U.S. Cl. ...................... 260/45.75 S; 260/45.95 R; 252/400 R; 252/404
[58] Field of Search ................... 260/45.75 S, 45.95 R; 252/404, 400 R

[56] References Cited

U.S. PATENT DOCUMENTS

| 3,313,761 | 4/1967 | Barnes et al. ................... 260/31.8 R |
| 3,483,159 | 12/1969 | Kauder ........................... 260/23 A X |
| 4,029,618 | 6/1977 | Dieckmann .................. 260/45.75 B |
| 4,134,878 | 1/1979 | Burley et al. ................. 260/45.75 S |
| 4,160,762 | 7/1979 | Minagawa et al. ............ 260/45.75 S |

*Primary Examiner*—V. P. Hoke
*Attorney, Agent, or Firm*—Stevens, Davis, Miller & Mosher

[57] ABSTRACT

Compositions for stabilizing a vinyl or vinylidene halide polymer or chlorinated polyethylene which comprise a major proportion of (a) at least one ester tin compound, for example β-carboalkoxyethyl tin mercaptides, β-carboalkoxyethyl tin mercapto-acid esters and the like and a minor proportion of (b) at least one unsubstituted or alkyl substituted o-dihydric phenol, such as catechol, t-butyl catechol and 2,3-dihydroxy naphthalene.

These compositions synergistically contribute to the heat stability of vinyl or vinylidene halide polymers or chlorinated polyethylene. The performance of the compositions disclosed is particularly improved as regards resistance to early discoloration and long term heat stability of the ester tin compounds contained in them. Moreover, the amounts in which the compounds need be used for stabilization can be kept relatively small.

10 Claims, No Drawings

COMPOSITIONS FOR STABILIZING A VINYL OR VINYLIDENE HALIDE POLYMER OR CHLORINATED POLYETHYLENE, POLYMER COMPOSITIONS COMPRISING SUCH A STABILIZER COMPOSITION AND SHAPED ARTICLES PREPARED THEREFROM

Compositions for stabilizing a vinyl or vinylidene halide polymer or chlorinated polyethylene, polymer compositions comprising such a stabilizer composition and shaped articles prepared therefrom.

The present invention relates to compositions suitable for use in stabilizing resins, particularly vinyl halide resins, to polymer compositions comprising such a stabilizer composition and to shaped articles prepared therefrom.

Organotin compounds are widely recognized as the best available single-compound stabilizers for polyvinyl chloride resins. Particularly in the foodstuffs branch (such as packaging film) the toxicity of the stabilizer is of great importance. It is known that ester tin compounds are much more favourable in this respect than the traditional butyl tin stabilizers.

United Kingdom Pat. No. 1 502 073 describes the unexpected degree of improvement in the utility and efficiency of these ester tin compounds for the heat stabilization of vinyl or vinylidene halide resins.

The present invention is directed to further improvements in resin stabilizer systems comprising ester tin compounds.

Accordingly the present invention provides a composition for stabilizing a vinyl or vinylidene halide polymer or chlorinated polyethylene comprising a major proportion of (a) at least one organotin compound of the formula:

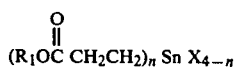

$$(R_1OC\ CH_2CH_2)_n\ Sn\ X_{4-n}$$

wherein $n=1$ or 2, $R_1$ is an alkyl group having from 1 to 18 carbon atoms and optionally carrying an alkoxy group having from 1 to 18 carbon atoms, a polyoxyalkylene group consisting of oxyalkylene groups having from 1 to 4 carbon atoms and carrying as the terminal group an alkyl group or a hydrogen atom, a cycloalkyl group having from 3 to 6 carbon atoms, an alkenyl group having from 2 to 4 carbon atoms or a phenyl group, X is ½ S, —S $R_2$, —S($CH_2$)$_m$COO $R_3$ or —S ($CH_2$)$_2$ OCO $R_4$ wherein $m=1$ or 2 and $R_2$ is an unsubstituted or β-hydroxy substituted alkyl group having from 1 to 18 carbon atoms, a cycloalkyl group having from 3 to 6 carbon atoms or a substituted or unsubstituted alkenyl, aryl, alkaryl or aralkyl group, $R_3$ is an alkyl group having from 1 to 18 carbon atoms and optionally carrying an alkoxy group having from 1 to 18 carbon atoms, a polyoxyalkylene group consisting of oxyalkylene groups having from 1 to 4 carbon atoms and carrying as the terminal group an alkyl group or a hydrogen atom, a cycloalkyl group having from 3 to 6 carbon atoms, an alkenyl group having from 2 to 4 carbon atoms or an aryl, alkaryl or aralkyl group, and $R_4$ is a substituted or unsubstituted alkyl group having from 1 to 17 carbon atoms or an unsubstituted or substituted aryl, alkaryl or aralkyl group, with the proviso that n is 2 when X is ½ S; and a minor proportion of (b) at least one unsubstituted or alkyl substituted o-dihydric phenol, the proportions of (a) and (b) being based on their combined weight.

The invention also provides a heat stabilized resin composition comprising a vinyl or vinylidene halide resin or chlorinated polyethylene and, as heat stabilizers components (a) and (b) defined above, and shaped articles formed from such compositions.

Synergistic heat stabilizers are provided by the compositions of the invention, i.e. the sum of the stabilizing effects of an amount of each component alone upon the resin is exceeded by the stabilizing effect of the same amounts of the components when used together in the resin formula. Such unexpected results and other advantages are empirically demonstrated in the numerous operating Examples of this invention, and a further understanding thereof will become apparent in view of the detailed description herein. The synergistic effectiveness is especially exhibited by an enhanced resistance of the resin formula to "mid term" discoloration during heating to elevated temperatures of about 175° C. to about 210° C. Also, long-term heat stability improvement can be achieved in addition to resistance to early discoloration. "Early colour" development is a term well understood in the art and means the time within which the resin starts to yellow under the influence of heat, either under static oven or dynamic working conditions, whereas "long term" heat stability refers to the time within which such resin severely darkens or degrades under the influence of heat to a dark colour, such as dark red or black.

It should be added that a combination of organotin compounds and a phenol compound are described in U.S. Pat. No. 3,483,159.

However, no mention is made of the tin compounds or the phenols used in the compositions of the invention.

U.S. Pat. No. 3,313,761 discloses a great many phenol stabilizers suitable for incorporation into a vinyl chloride polymer, optionally together with a metal compound. The only tin compounds specifically disclosed are dibutyl tin dilaurate and dibutyl tin diacetate. Neither of the above U.S. patent specifications explicitly mentions the synergistic effect that will be obtained with sulfur-containing ester tin stabilizers and 1,2-dihydroxyphenol or derivatives thereof. The stabilizer compositions of the invention can be employed in amounts ranging between wide limits. Particularly useful stabilized resin compositions are obtained using a total of 0.05 to 5 parts by weight, based upon 100 parts by weight (phr) of the resin. A particularly preferred range is 0.05 to 3 phr, depending upon the desired heat stability in a particular resin composition consistent with other requirements and economics.

There are certain generally preferred weight ratios of the sulfur-containing ester tin compound to a particular o-dihydric phenol. This will become apparent from the detailed operating Examples. However, it should be noted that the most desirable weight ratios for each of the essential components of the composition of this invention for a particular application and resin system can be arrived at in accordance with the teachings of this invention. Thus in its broadest aspects, the present invention is not limited to particular weight ratios of the components of the stabilizer composition. It has been found that the synergistic stabilization levels of a particular o-dihydric phenol and a particular sulfur-containing ester tin will vary as exemplified herein. But, most preferably the combination of o-dihydric phenol and the sulfur-containing ester tin is utilized in a total amount of 0.05 to 3 phr. Preferably, the o-dihydric phenol is present in the stabilizer compositions in an amount of from 1 to 10 percent by weight of the ester tin, although amounts of from 0.5% by weight or slightly below up to 20% by weight or more of the phenol, based on the weight of the ester tin, may be used.

The ester tin compounds which are used in the compositions of this invention have an

group wherein $R_1$ is an alkyl group having from 1 to 18 carbon atoms and optionally carrying an alkoxy group having from 1 to 18 carbon atoms, a polyoxyalkylene group consisting of oxyalkylene groups having from 1 to 4 carbon atoms and carrying as the terminal group an alkyl group or a hydrogen atom, a cycloalkyl group having from 3 to 6 carbon atoms, an alkenyl group having 2 to 4 carbon atoms or a phenyl group.

Examples of alkyl groups having from 1 to 18 carbon atoms are methyl, ethyl, propyl, n-butyl and octadecyl. Examples of polyoxyalkylene groups consisting of oxyalkylene groups having from 1 to 4 carbon atoms and carrying as the terminal group an alkyl group or a hydrogen atom are ethoxyethyl and n-butoxyethyloxyethyl. An example of a cycloalkyl group is cyclohexyl. An example of an alkenyl group having from 2 to 4 carbon atoms is allyl.

The ester tin compounds suitable for use in this invention are derived from tetravalent tin and include mercaptides of the following general formula:

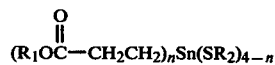

wherein $R_2$ represents an unsubstituted or substituted alkyl, cycloalkyl, aryl, alkaryl or aralkyl group. Examples of such groups are alkyl groups such as ethyl, propyl, butyl, octyl, nonyl, lauryl and octadecyl; aryl, alkaryl and aralkyl groups such as phenyl, benzyl, naphthyl, xylyl or phenylethyl. The group $SR_2$, for example, may be a mercaptan or mercapto alcohol residue. As indicated, aliphatic and aromatic mercaptans may be employed to form the group $SR_2$. In the case of aliphatic mercaptans, those having from 8 to 18 carbon atoms, e.g. decyl or dodecyl mercaptan, are usually preferred because the lower mercaptans are unsuitable for the preparation and use of the stabilizers on account of their offensive smell. Suitable aromatic mercaptans are, for example thionaphthol, thiobenzyl alcohol and phenoxyethyl mercaptan. Examples of suitable mercapto alcohols are monothioethylene glycol, monothiopropylene glycol, thioglycerol and thiodiethylene glycol. Specific examples of such ester tin mercaptides are di($\beta$-carbomethoxyethyl)tin dibenzylmercaptide and $\beta$-carbolauroxyethyl tin trioctylmercaptide.

British Patent Specification No. 1,502,073 describes compounds of the formula

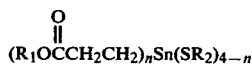

Sulfur-containing ester tin compounds other than the ester tin mercaptides of the above formula, are suitable for use in the present invention. Such compounds include ester tin mercaptoacid esters which may be further defined by the following formula:

wherein $m = 1$ or 2 and $R_3$ has the meaning given above. Thus the sulfur-containing group may be derived from mercaptoacetic or $\beta$-mercaptopropionic acid and decanols, glycerol, glycol monoesters, dihydro abietyl alcohol, phenoxyethanol or pentaerythritol.

Specific examples of such ester tin mercaptides are di($\beta$-carbobutoxyethyl)tin bis(isooctylthioglycollate), di($\beta$-carboethyloxyethyloxyethyl) tin bis(octadecyl-$\beta$-mercaptopropionate) and $\beta$-carbobutoxyethyltin tris (laurylthioglycollate). Also suitable for use in the invention are the ester tin compounds of the formula:

wherein $R_4$ has the meaning given above. Particularly preferred are the ester tin mercaptides derived from the esters of mercapto acids formed between thioglycol and an aliphatic, aromatic or alicyclic saturated or unsaturated monocarboxylic acid. A specific example of such an ester tin mercaptide is di($\beta$-carbobutoxyethyl)tin bis(2-mercaptoethyloleate).

Another group of sulfur-containing ester tin compounds suitable for use in the invention are those of the formula:

wherein $R_1$ has the meaning given above.

Specific examples are di($\beta$-carbobutoxyethyl)tin sulfide, di($\beta$-carbophenoxyethyl)tin sulfide, di($\beta$-carbooctadecyloxyethyl)tin sulfide and di($\beta$-carbobutoxyethyloxyethyloxyethyl)tin sulfide.

The ortho-dihydric phenol can be mono- or polynuclear and specific examples of ortho-dihydric phenols which have been found advantageous are catechol, tertiary butyl catechol and 2,3-dihydroxy-naphthalene. The ortho-dihydric phenols may be represented by the following structural formula:

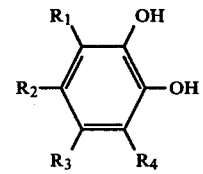

wherein each of $R_1$, $R_2$, $R_3$ and $R_4$ is hydrogen or an alkyl group or any two adjacent substituents may form a part of an aromatic or alkylated aromatic nucleus as is the case when the phenolic nucleus is naphthalene. Alkyl substituents which may be present include straight or branched chain $C_1$–$C_{12}$ groups such as methyl, ethyl, n-propyl, pentyl, hexyl, heptyl, dodecyl, tertiary butyl or isopropyl. The phenols most preferably used in accordance with the present invention are the catechol derivatives because of their performance and commercial availability. Other monohydric or trihydric phenols, or other functionally substituted mono-, di- or trihydric phenols, have not been found to provide synergistic resin heat stabilizing activities. For example, other seemingly chemically similar phenols such as gallic acid, resorcinol, hydroquinone, and nonylphenol have not been found to provide equivalent synergistic heat stabilization effects with the sulfur-containing ester tin compounds of the present invention.

The present invention is not only very specific with respect to the choice of the dihydric phenols, it is also very particular in the choice of the organotin compounds.

Accordingly, the traditional butyl tin stabilizers, whether or not they contain sulfur may even provide an antagonistic effect with the use of the orthodihydric phenols of the stabilizer composition of the invention. This also applies to the use of monoestertin sulfide and ester tin carboxylates.

The stabilizer compositions of the present invention are particularly suitable for improving the thermal stability of polyvinyl chloride resins of all types, by whatever process they are prepared, such as solution polymerization, emulsion polymerization and suspension polymerization.

By the term "polyvinyl chloride" as used herein is meant not only polyvinyl chloride homopolymers of all types, and of post-chlorinated polyvinyl chloride, but also of copolymers comprising a major proportion of vinyl chloride, with a minor proportion of other copolymerizable monomers, such as copolymers of vinyl chloride and vinyl acetate, copolymers of vinyl chloride and vinylidene chloride, copolymers of vinyl chloride and acrylonitrile, copolymers of vinyl chloride with maleic or fumaric acid esters and copolymers of vinyl chloride with styrene, and also mixtures of a major proportion of polyvinyl chloride resins with a minor proportion of other synthetic resins, such as chlorinated polyethylene, copolymers of acrylonitrile, butadiene and styrene.

The present invention will be further described with reference to the following detailed Examples which serve to illustrate the types of specific materials and their amounts as used in typical resin formulations, and the synergism displayed by the essential combination of components in the stabilizer compositions of this invention.

The heat stability data given in the examples was obtained by mixing the components of each specific formulation for 2 to 5 minutes on a two roll laboratory mill at a temperature between 155° and 180° C. until the mix was thoroughly homogeneous. The required samples were taken from the resulting sheet, which was removed from the roll when it had a thickness of 0.125 cm. The samples were heated in a Werner Mathis air circulating oven at a temperature between 185° and 210° C. and withdrawn therefrom at regular intervals (2 to 10 minutes) when they were examined visually for rate of colour development, which was taken as a measure of the rate of decomposition of the polyvinyl chloride. The results of the test are given in the examples in terms of the time required by the samples to develop specific colours.

EXAMPLE 1

The following "rigid" polyvinylchloride (PVC) formulation was prepared and tested in the above described manner. The time intervals were 2 minutes and the oven temperature was maintained at 210° C. The colour test results for each of the oven samples were rated from 0 (colourless) to 10 (black).

|  | Parts by weight |
|---|---|
| PVC of K value 60 | 100 |
| glycerol mono-oleate | 1.1 |
| montanic acid ester wax | 0.5 |
| acrylic impact modifier | 5.0 |
| processing aid (an acrylic polymer) | 1.0 |
| dodecyl phenyl phosphite | 0.5 |
| stabiliser composition | 1.5 |

The stabilizer consisted of (A) a mainly ester tin containing composition, viz: di($\beta$-carbobutoxyethyl)tin bis(isooctylthioglycollate) (90% by weight) hereinafter "BTI", a 2,4,6-trisubstituted phenolic antioxidant (5% by weight) and epoxy soya bean oil (5% by weight), and (B) optionally 5% by weight—for partial replacement of A—of a dihydric phenol.

TABLE I

| stabilizer composition | Colour developed after stated period at 210° C. time (minutes) | | | | | | | |
|---|---|---|---|---|---|---|---|---|
|  | 0 | 2 | 4 | 6 | 8 | 10 | 12 | 14 |
| 100% A | 0 | 0 | 1 | 1 | 1 | 10 | | |
| 95% A + 5% catechol | 0 | 0 | 0 | 0 | 2 | 4 | 9 | 9 |
| 95% A + 5% t-butylcatechol | 0 | 0 | 0 | 0 | 2 | 5 | 8 | 8 |
| 95% A + 5% resorcinol | 1 | 1 | 2 | 3 | 10 | | | . |

The above table clearly demonstrates that the BTI or di($\beta$-carbobutoxyethyl)tin bis(isooctylthioglycollate) in combination with catechol or t-butylcatechol improves the mid-term as well as the long term colour performance of the BTI alone. The total whiteness ratings of each of the combinations versus the whiteness ratings of the BTI alone (100% A) is indicative of far superior performance of the combinations.

The use of resorcinol, which is not an ortho-dihydric phenol, shows an antagonistic effect when used along with BTI.

EXAMPLE 2

The same "rigid" polyvinyl chloride (PVC) formulation was prepared as in Example 1 and tested in the above-described manner. After gelation the formulation was mixed for 2 minutes on a two-roll mill at 175° C. Strips were then removed and placed in a Werner Mathis air circulating oven maintained at 210° C. Successive portions of the strips were ejected at 2 minute intervals and their colours were rated from 1 (colourless) to 10 (black).

The di($\beta$-carbobutoxyethyl)tin bis(isooctylthioglycollate) (BTI) was compared with $\beta$-carbobutoxyethyl tin tris(isooctylthioglycollate) (BTT), dibutyl tin bis(isooctylthioglycollate) (ABTI) and butyltin tris(isooctylthioglycollate) (ABTT). ABTI and ABTT are alkyl tins.

TABLE II

| | Colour developed after stated period at 210° C. | | | | | | | |
|---|---|---|---|---|---|---|---|---|
| stabilizer | time (minutes) | | | | | | | |
| composition | 0 | 2 | 4 | 6 | 8 | 10 | 12 | 14 |
| 100% BTI | 1 | 1 | 2 | 3 | 4 | 10 | 10 | 10 |
| 90% BTI + 10% t-butyl catechol | 1 | 1 | 3 | 4 | 6 | 8 | 9 | 10 |
| 100% BTT | 1 | 1 | 2 | 10 | 10 | 10 | 10 | 10 |
| 90% BTT + 10% t-butyl catechol | 1 | 1 | 3 | 5 | 8 | 10 | 10 | 10 |
| 100% ABTI | 1 | 3 | 4 | 4 | 5 | 6 | 7 | 8 |
| 90% ABTI + 10% t-butyl catechol | 1 | 4 | 5 | 5 | 6 | 6 | 7 | 9 |
| 100% ABTT | 1 | 1 | 2 | 3 | 4 | 5 | 10 | 10 |
| 90% ABTT + 10% t-butyl catechol | 1 | 2 | 3 | 4 | 5 | 7 | 10 | 10 |

These results show how t-butyl catechol improves the long term performance of ester tin stabilizers, but has no beneficial effect used in combination with butyl tin stabilizers. The slight mid-term discolouration observed with the combination t-butyl catechol and BTI and BTT respectively, can be readily compensated for by the addition of conventional stabilizer ingredients such as a 2,4,6-trisubstituted phenol and/or an epoxy compound (as exemplified in Example 1).

EXAMPLE 3

A "rigid" polyvinyl chloride (PVC) formulation was prepared containing the following ingredients:

| | Parts by weight |
|---|---|
| PVC of K value 67 | 100 |
| a stearate coated whiting | 3 |
| titantium dioxide | 1 |
| calcium stearate | 0.8 |
| paraffin wax | 0.5 |
| oxidized polyethylene wax | 0.15 |
| acrylic processing aid | 1 |
| stabilizer composition | see below |

The blends were mixed on a two roll mill at 160° C. for four minutes after gelation. Strips were then removed and placed in a Werner Mathis air circulating oven maintained at 185° C. Successive portions of the strips were ejected automatically at 5 minute intervals and their colours were rated from 1 (white) to 10 (dark grey).

β-carbobutoxyethyl tin tris(2-mercaptoethyl oleate) (BTM), di(β-carbobutoxyethyl)tin bis(2-mercaptoethyl oleate) (BBM), β-carbobutoxyethyl tin tris(isooctylthioglycollate) (BTT), di(β-carbobutoxyethyl)tin bis(isooctylthioglycollate) (BTB)

and "mixed" butyltin sulphides containing 42% by weight dibutyl tin disulfide and 58% monobutyl tin sulfide were compared with each other in the presence or not of catechol.

The results are given in Table III.

TABLE III

| | Colour developed after stated period at 185° C. | | | | | | | | | | |
|---|---|---|---|---|---|---|---|---|---|---|---|
| stabilizer | time (minutes) | | | | | | | | | | |
| composition | 0 | 5 | 10 | 15 | 20 | 25 | 30 | 35 | 40 | 45 | 50 |
| 0.4 phr BTM | 3 | 4 | 5 | 6 | 7 | 8 | 9 | 9 | 9 | 9 | 9 |
| 0.4 phr BTM + 0.03 phr catechol | 2 | 3 | 5 | 6 | 7 | 8 | 8 | 9 | 9 | 9 | 9 |
| 0.4 phr BBM | 6 | 7 | 7 | 7 | 8 | 8 | 8 | 8 | 8 | 8 | 8 |
| 0.4 phr BBM + 0.3 phr catechol | 3 | 5 | 6 | 7 | 7 | 8 | 8 | 8 | 8 | 8 | 8 |
| 0.4 phr BTT | 2 | 3 | 3 | 4 | 5 | 5 | 6 | 7 | 8 | 9 | 9 |
| 0.4 phr BTT + 0.03 phr catechol | 2 | 2 | 3 | 4 | 5 | 5 | 6 | 7 | 7 | 8 | 8 |
| 0.4 phr BTB | 3 | 4 | 6 | 6 | 7 | 7 | 7 | 8 | 8 | 8 | 8 |
| 0.4 phr BTB + 0.03 phr catechol | 2 | 3 | 4 | 6 | 7 | 7 | 7 | 8 | 8 | 8 | 8 |
| 0.2 phr "mixed" butyltin sulfides | 3 | 3 | 3 | 3 | 4 | 5 | 6 | 6 | 7 | 8 | 8 |
| 0.2 phr "mixed" butyltin sulfides + 0.03 phr catechol | 5 | 8 | 9 | 9 | 10 | 10 | 10 | 10 | 10 | 10 | 10 |

The results in the above table clearly demonstrate that the addition of catechol to PVC stabilized with mono- and diester tin mercaptides improves the performance, but addition of catechol to "mixed" butyl tin sulfides causes a drastic deterioration in performance.

EXAMPLE 4

A similar "rigid" polyvinyl chloride (PVC) formulation was prepared as in Example 1.

Diester tin sulfide di(β-carbobutoxyethyl)tin sulfide $(BuAc)_2SnS$ was compared with a monoester tin sulfide β-carbobutoxyethyl tin sulfide $(BuAcSnS_{3/2})$, monobutyltin sulfide $(BuSnS_{3/2})$ and dibutyl tin sulfide $(Bu_2SnS)$ in the presence or not of catechol.

The results are given in Table IV.

TABLE IV

| | Colour developed after stated period at 185° C. | | | | | | | |
|---|---|---|---|---|---|---|---|---|
| stabilizer | time (minutes) | | | | | | | |
| composition | 0 | 2 | 4 | 6 | 8 | 10 | 12 | 14 |
| 0.57 phr $BuAcSnS_{3/2}$ | 2 | 2 | 5 | 7 | 10 | | | |
| 0.57 phr $BuAcSns_{3/2}$ + 0.15 phr catechol | 4 | 6 | 8 | 8 | 10 | | | |
| 0.78 phr $(BuAc)_2SnS$ | 3 | 3 | 5 | 5 | 6 | 7 | 9 | 10 |
| 0.78 phr $(BuAc)_2SnS$ + 0.15 phr catechol | 0 | 1 | 2 | 3 | 3 | 5 | 8 | 10 |
| 0.29 phr $BuSnS_{3/2}$ | 1 | 2 | 4 | 7 | 10 | | | |
| 0.29 phr $BuSnS_{3/2}$ + 0.15 phr catechol | 4 | 5 | 6 | 7 | 9 | 10 | | |
| 0.34 phr $Bu_2SnS$ | 1 | 3 | 4 | 6 | 7 | 8 | 9 | 9 |
| 0.34 phr $Bu_2SnS$ + 0.15 phr catechol | 4 | 5 | 5 | 8 | 8 | 9 | 10 | |

It can be seen from Table IV that a synergistic effect is reached here only with the use of a diester tin sulfide. The other sulfides even show an antagonistic effect when use is made of an o-dihydric phenol.

EXAMPLE 5

A "rigid" polyvinyl chloride (PVC) formulation was prepared containing the following ingredients:

| | Parts by weight |
|---|---|
| PVC of K value 67 | 100 |
| stearate coated whiting | 3 |
| titanium dioxide | 1.0 |
| calcium stearate | 0.8 |
| paraffin wax | 0.5 |
| oxidized polyethylene wax | 0.15 |
| acrylic processing aid | 1.0 |

-continued

| stabilizer composition | Parts by weight |
|---|---|
| stabilizer composition | see below |

After gelation the blends were mixed for four minutes on a two roll mill at 160° C. Strips were then removed and placed in a Werner Mathis air circulating oven maintained at 185° C. Successive portions of the strips were ejected automatically at 5 minute intervals and their colours were rated from 1 (white) to 10 (dark grey).

The results are given in Table V.

TABLE V

| stabilizer composition | Colour developed after stated period at 185° C. time (minutes) | | | | | | | | | | |
|---|---|---|---|---|---|---|---|---|---|---|---|
| | 0 | 5 | 10 | 15 | 20 | 25 | 30 | 35 | 40 | 45 | 50 |
| 0.4 phr (BuAc)₂SnS | 6 | 6 | 6 | 6 | 7 | 7 | 8 | 8 | 8 | 8 | 8 |
| 0.4 phr (BuAc)₂SnS + 0.03 phr catechol | 3 | 3 | 3 | 4 | 4 | 5 | 6 | 7 | 7 | 7 | 8 |

The above Table clearly shows that the performance of (BuAc)₂SnS is considerably enhanced by the addition of catechol.

We claim:

1. A composition for stabilizing a vinyl or vinylidene halide polymer or chlorinated polyethylene comprising a major proportion of (a) at least one organotin compound of the formula:

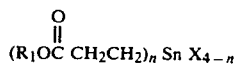

$$(R_1OC\,CH_2CH_2)_n\,Sn\,X_{4-n}$$

wherein n = 1 or 2, $R_1$ is an alkyl group having from 1 to 18 carbon atoms and optionally carrying an alkoxy group having from 1 to 18 carbon atoms, a polyoxyalkylene group consisting of oxyalkylene groups having from 1 to 4 carbon atoms and carrying as the terminal group an alkyl group or a hydrogen atom, a cycloalkyl group having from 3 to 6 carbon atoms, and alkenyl group having 2 to 4 carbon atoms, or a phenyl group, X is ½ S, —S $R_2$, —S(CH₂)$_m$COO $R_3$ or —S(CH₂)₂ OCO $R_4$ wherein m = 1 or 2 and $R_2$ is an unsubstituted or β-hydroxy substituted alkyl group having from 1 to 18 carbon atoms, a cycloalkyl group having from 3 to 6 carbon atoms or a substituted or unsubstituted alkenyl, aryl, alkaryl or aralkyl group, $R_3$ is an alkyl group having from 1 to 18 carbon atoms and optionally carrying an alkoxy group having from 1 to 18 carbon atoms, a polyoxyalkylene group consisting of oxyalkylene groups having from 1 to 4 carbon atoms and carrying as the terminal group an alkyl group or a hydrogen atom, a cycloalkyl group having from 3 to 6 carbon atoms, an alkenyl group having from 2 to 4 carbon atoms or an aryl, alkaryl or aralkyl group, and $R_4$ is a substituted or unsubstituted alkyl group having from 1 to 17 carbon atoms or an unsubstituted or substituted aryl, alkaryl or aralkyl group, with the proviso that n is 2 when X is ½ S; and a minor proportion of (b) at least one unsubstituted or alkyl substituted o-dihydric phenol, the proportions of (a) and (b) being based on their combined weight.

2. A composition as claimed in claim 1 which comprises from 0.5 to 20 parts by weight of (b) per 100 parts by weight of (a).

3. A composition as claimed in claim 2 which comprises from 1 to 10 parts by weight of (b) per 100 parts by weight of (a).

4. A composition as claimed in claim 2 which comprises from 8 to 12 parts by weight of (b) per 100 parts by weight of (a).

5. A composition as claimed in any one of the preceding claims wherein the organotin compound is di(β-carbobutoxyethyl)tin bisisooctylthioglycollate, β-carbobutoxyethyl tin tris(2-mercaptoethyl oleate), di(β-carbobutoxyethyl)tin bis(2-mercaptoethyl oleate), β-carbobutoxyethyl tin tris(isooctylthioglycollate) or di(β-carbobutoxyethyl)tin sulphide or a mixture of two or more thereof.

6. A composition as claimed in any one of the preceding claims wherein the phenol is catechol, t-butyl catechol or 2,3-dihydroxynaphthalene.

7. A polymer composition which comprises a vinyl or vinylidene halide resin or chlorinated polyethylene and which incorporates therein a stabilizer composition as claimed in any one of claims 1 to 6.

8. A composition as claimed in claim 7 which contains 0.05 to 5 parts by weight of (a)+(b) per 100 parts by weight of resin.

9. A composition as claimed in claim 8 which contains 0.05 to 3 parts by weight of (a)+(b) per 100 parts by weight of resin.

10. A shaped article prepared from a resin-containing composition as claimed in any one of claims 7 to 9.

* * * * *